(12) United States Patent
Bouillon

(10) Patent No.: US 9,421,897 B2
(45) Date of Patent: Aug. 23, 2016

(54) ASSEMBLY FOR RECEIVING THE HEEL OF A USER OF A MOTOR VEHICLE

(71) Applicant: RENAULT s.a.s., Boulogne-Billancourt (FR)

(72) Inventor: Jean-Charles Bouillon, La Queue lez Yvelines (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 14/378,516

(22) PCT Filed: Jan. 30, 2013

(86) PCT No.: PCT/EP2013/051769
§ 371 (c)(1),
(2) Date: Aug. 13, 2014

(87) PCT Pub. No.: WO2013/120693
PCT Pub. Date: Aug. 22, 2013

(65) Prior Publication Data
US 2015/0165951 A1    Jun. 18, 2015

(30) Foreign Application Priority Data

Feb. 13, 2012 (FR) .................................... 12 51307

(51) Int. Cl.
*B60N 3/04* (2006.01)
*B60R 21/04* (2006.01)
*B60N 3/06* (2006.01)
*B60R 21/00* (2006.01)

(52) U.S. Cl.
CPC .............. *B60N 3/048* (2013.01); *B60N 3/066* (2013.01); *B60R 21/04* (2013.01); *B60R 2021/0046* (2013.01)

(58) Field of Classification Search
CPC ...... B60N 3/048; B60N 3/066; B60R 21/04; B60R 2021/0046
See application file for complete search history.

(56) References Cited

U.S. PATENT DOCUMENTS 3,047,088 A * 7/1962 Murrell .................... G05G 1/60
180/90.6
2003/0222478 A1   12/2003 Akasaka et al.

FOREIGN PATENT DOCUMENTS

DE    102008025839 A1 * 12/2009 ............ B60N 3/066
EP    1 093 961        4/2001
(Continued)

OTHER PUBLICATIONS

French Search Report Issued Oct. 24, 2012 in Application No. FR 1251307 Filed Feb. 13, 2012.
(Continued)

*Primary Examiner* — Glenn Dayoan
*Assistant Examiner* — Melissa A Black
(74) *Attorney, Agent, or Firm* — Oblon, McClelland, Maier & Neustadt, L.L.P.

(57) ABSTRACT

An assembly for receiving a heel of a user of a motor vehicle under a pedal and/or a footrest of a motor vehicle passenger compartment, including at least a thickness of acoustic felt resting on a floor of the vehicle, a receiving element resting on the acoustic layer and including at least a bearing and pivoting area for the heel, and a mat covering the element. The receiving element is formed from a hollow housing including at least a rigid rear transverse wall, which protrudes relative to the horizontal to form the bearing and pivoting area for the heel of the user and a horizontal transverse wall secured to the floor of the vehicle and configured to deform in event of an impact.

10 Claims, 3 Drawing Sheets

(56) References Cited

FOREIGN PATENT DOCUMENTS

| FR | 2 874 874 | 3/2006 |
| FR | 2 929 565 | 10/2009 |

OTHER PUBLICATIONS

International Search Report Issued Mar. 4, 2013 in PCT/EP13/051769 Filed Jan. 30, 2013.

* cited by examiner

ASSEMBLY FOR RECEIVING THE HEEL OF A USER OF A MOTOR VEHICLE

BACKGROUND

The invention relates to an assembly for receiving the heel of a user of a motor vehicle below a pedal and/or a footrest of the passenger compartment of a motor vehicle.

The invention relates more particularly to an assembly for receiving the heel of a user of a motor vehicle below a pedal and/or a footrest of the passenger compartment of a motor vehicle, comprising at least:

- a thickness of acoustic felt which is able to rest on a horizontal floor, made of sheet metal, of the passenger compartment of the vehicle,
- an at least partially deformable receiving element which rests on said felt and which comprises at least one portion which projects with respect to the horizontal and which forms a region on which the heel of the user can press and pivot,
- a carpet covering said element and the acoustic felt.

Numerous examples of assemblies of this type are known.

According to a first known design, the receiving element consists of a block of expanded polystyrene, polypropylene or polyurethane which is inserted between the acoustic foam and the carpet. The foam is molded onto the receiving element such that cohesion, that is to say between the foam and the receiving element, is ensured.

This solution is relatively costly as it requires operations for shaping the acoustic foam on the receiving element and represents a substantial cost in terms of logistics. According to a second known design, the receiving element consists of a block of expanded polystyrene of great length which is inserted between the acoustic foam and the carpet. The great length of the element ensures a large surface area for the foam to adhere to the receiving element.

This solution is relatively costly as it considerably increases the cost of the receiving element.

BRIEF SUMMARY

The invention remedies this drawback by proposing a new design for an intermediate element which can be inserted between a layer of an acoustically absorbent material and a low-cost carpet.

To that end, the invention proposes an assembly of the type described above, characterized in that the receiving element comprises a hollow casing which rests on the layer of acoustically absorbent material and which is delimited by:

- at least one rigid rear transverse wall which projects with respect to the horizontal so as to form the region on which the heel of the user can press and pivot,
- at least one horizontal transverse wall, comprising a front end which is attached to the floor of the vehicle, and which is designed to deform in the event of an impact so as to dissipate the kinetic energy of the foot of the user.

According to other features of the invention:

- the receiving element comprises, in addition, two side walls connecting the rear wall and the horizontal transverse wall, which are designed to deform in the event of an impact so as to help dissipate the kinetic energy of the foot of the user,
- the rigid rear transverse wall comprises an outer face which forms the region on which the heel of the user can press and pivot and an opposite inner face on the back of which there extend, transversely, a plurality of stiffening ribs,
- the lower end of the rigid rear transverse wall comprises a lower tab which comprises at least one claw for gripping in the acoustic felt,
- the lower tab extends substantially along the width of the rear transverse wall and it comprises a plurality of gripping claws of substantially conical shape which are designed to penetrate into the acoustic felt so as to hold the hollow casing,
- the rigid rear transverse wall extends with an inclination determined with respect to the horizontal orientation of the floor and the lower tab extends substantially parallel to the floor,
- the front end of the horizontal transverse wall comprises a front tab through which there passes a hole which is designed to receive an element for the axial immobilization of the tab on the floor,
- the immobilizing element comprises a stud which is welded to the floor of the vehicle,
- the floor of the vehicle extends with an inclination determined close to the front end of the horizontal transverse wall and the front tab extends substantially parallel to said floor.

BRIEF DESCRIPTION OF THE DRAWINGS

Other features and advantages of the invention will appear upon reading the following detailed description, which will be understood with reference to the appended drawings, in which.

DETAILED DESCRIPTION

In the following description, identical reference numbers designate parts which are identical or which have similar functions.

Figure 1:
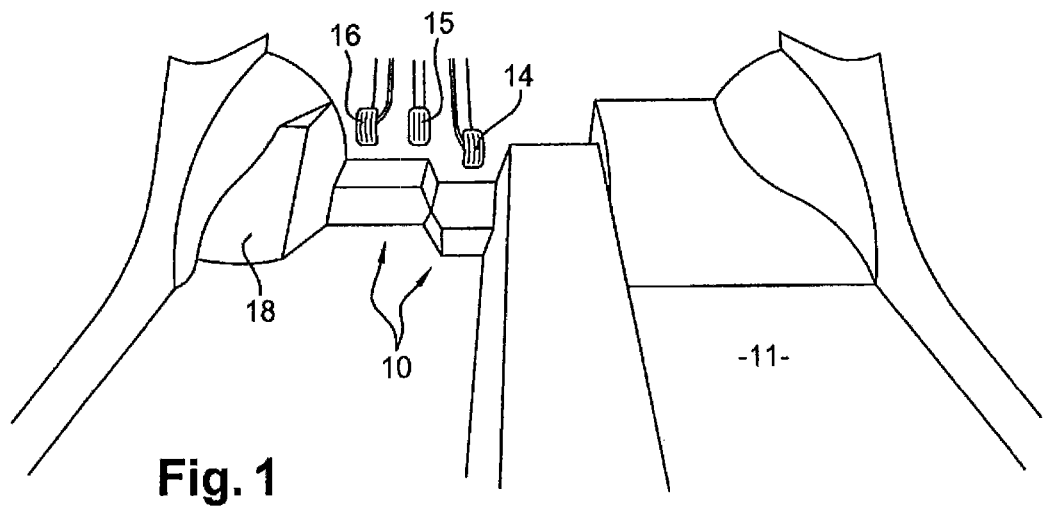
FIG. 1 is an overall perspective view of a lower portion of the passenger compartment of a motor vehicle.

FIGS. 2 to 5 and 7 show an assembly 10 for receiving the heel 12 of a user of a vehicle. As shown in FIG. 1, such an assembly 10 is designed to be arranged in a lower portion 11 of the passenger compartment of a motor vehicle, below an accelerator pedal 14, brake pedal 15 or clutch pedal 16, or in front of a footrest 18 of the passenger compartment of a motor vehicle.

Figure 2:
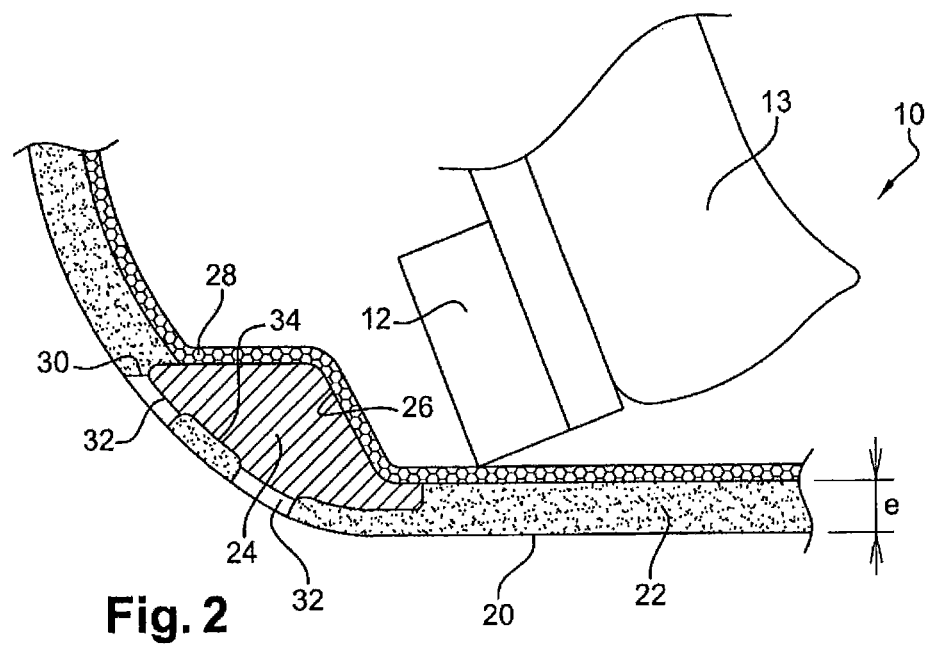
FIG. 2 is a schematic view in section of an assembly according to a first example of the prior art.

As is known, and as shown in FIG. 2, such an assembly 10 comprises, from bottom to top at least one thickness "e" of acoustic foam 22 which is designed to rest on a horizontal floor 20, made of sheet metal, of the passenger compartment of the vehicle, then a receiving element 24, which is at least partially deformable, which is inserted into said foam 22 and which comprises at least one portion 26 which projects with respect to the horizontal, which forms a region on which the heel 12 of a foot 13 of the user can press and pivot, and finally a carpet 28 covering said element 24 and the acoustic foam 22.

The receiving element 24 conventionally consists of a block of expanded polystyrene, polyurethane or polypropylene which is inserted between the acoustic foam 22 and the carpet 28. The receiving element 24 holds by cohesion between the foam 22 and the element 24. This cohesion is obtained when injecting the foam around the receiving element 24 for maximum effectiveness the receiving element 24 must bear against the sheet metal from the very beginning of the impact. It is therefore necessary, in order to improve effectiveness, to leave 3 mm of air in the regions 32.

This solution is relatively costly as it requires particular operations for molding the acoustic foam 22 onto the receiving element 24.

Figure 3:
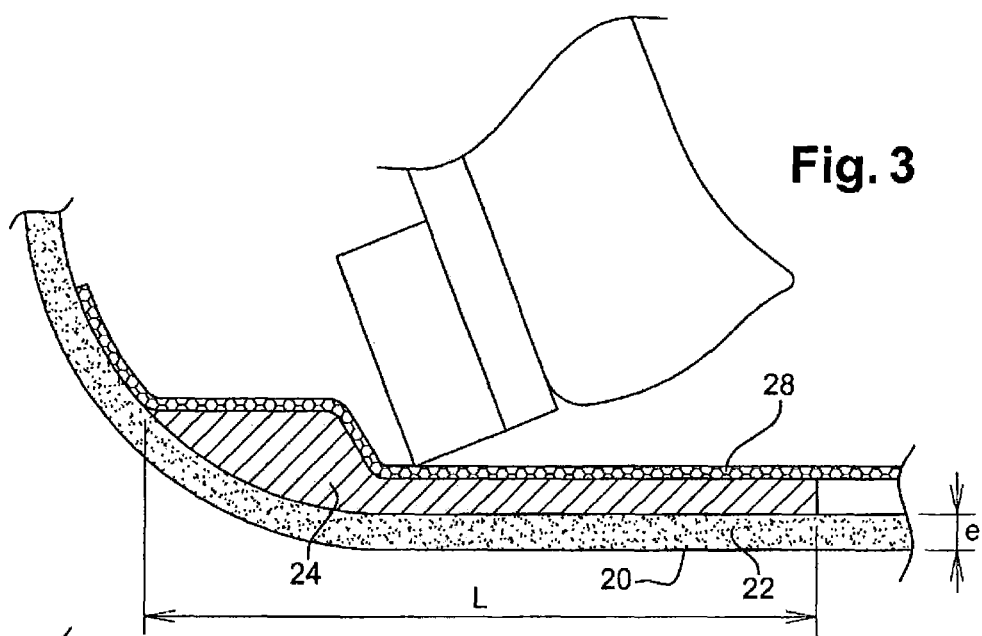
FIG. 3 is a schematic view in section of an assembly according to a second example of the prior art.

According to a second known design, which has been shown in FIG. 3, the receiving element 24 consists of a block 24 of expanded polystyrene of great length "L" which is simply placed onto an acoustic felt 22. The carpet 28 is then placed on top in the factory. The great length "L" of the element 24 ensures its stability in the event of an impact by bearing against numerous points in the footwells 11.

This solution is relatively costly as it increases considerably the cost of the receiving element 24.

Figure 4:
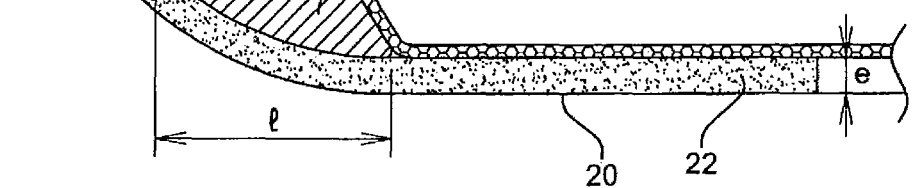
FIG. 4 is a schematic view in section of a non-functional assembly variant.

When one wishes to reduce the manufacturing cost of such an assembly, thoughts naturally turn, as shown in FIG. 4, to reducing the length of the element 24 to a reduced length "l". This design is not feasible as an element 24 having too short a length "l" would be forced, by the heel 12 of the driver, to slide between the acoustic felt 22 and the carpet 28. Moreover, the available height between the carpet 28 and the sheet metal 22 does not always permit this.

The invention remedies this drawback by proposing an assembly comprising a new design for the receiving element 24.

Figure 5:
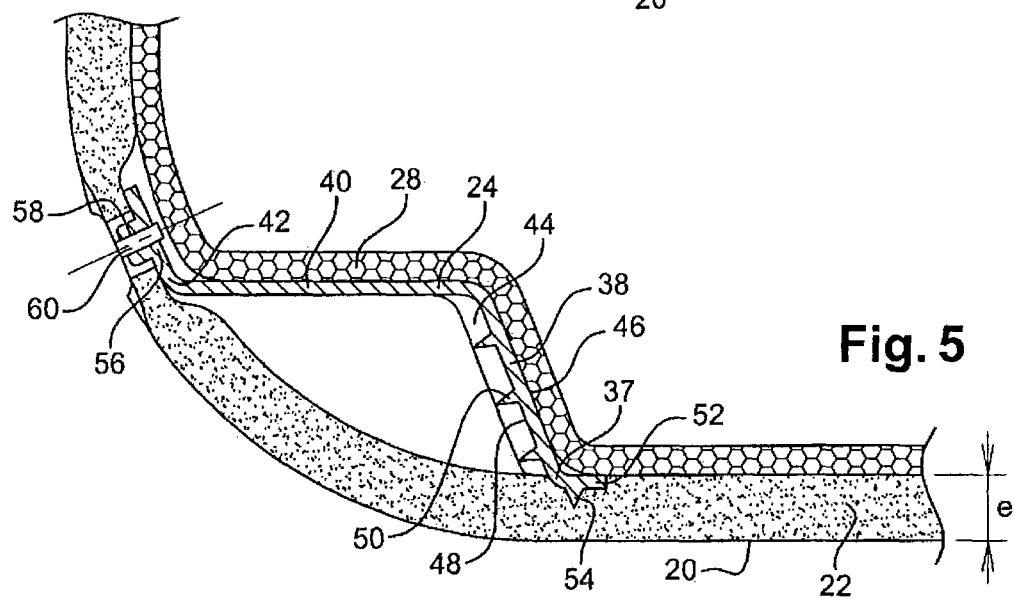
FIG. 5 is a schematic view in section of an assembly according to the invention in the rest position.

In accordance with the invention, and as shown in FIG. 5, the receiving element 24 consists of a hollow casing 24 which rests on a foam-type acoustic layer 22 and which is delimited by:
- at least one rigid rear transverse wall 38 which projects with respect to the horizontal so as to form the region on which the heel 12 of the user can press and pivot,
- at least one horizontal transverse wall 40, comprising a front end 42 which is attached to the floor 20 of the vehicle, and which is designed to deform in the event of an impact so as to dissipate the kinetic energy of the foot 13 of the user.

Figure 6:
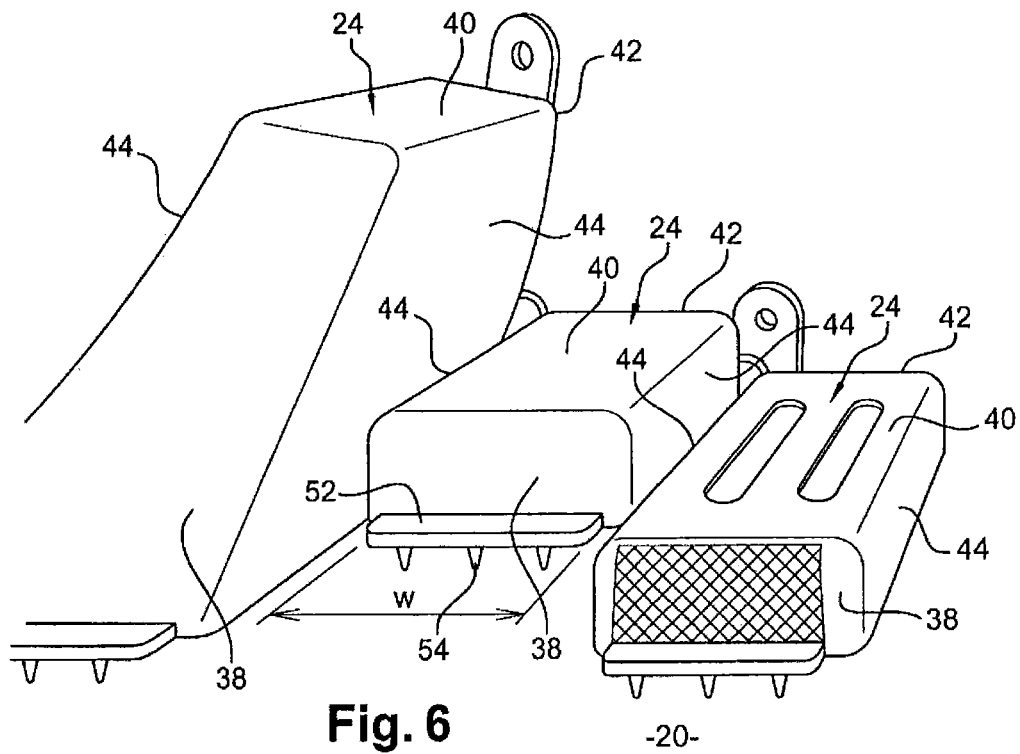
FIG. 6 is a schematic perspective view of the assembly according to the invention in the rest position.

Preferably, as shown in FIG. 6, the receiving element 24 comprises, in addition, two side walls 44 connecting the rear wall 38 and the horizontal transverse wall 40, which are designed to deform in the event of an impact so as to help dissipate the kinetic energy of the foot 13 of the user.

Figure 7:
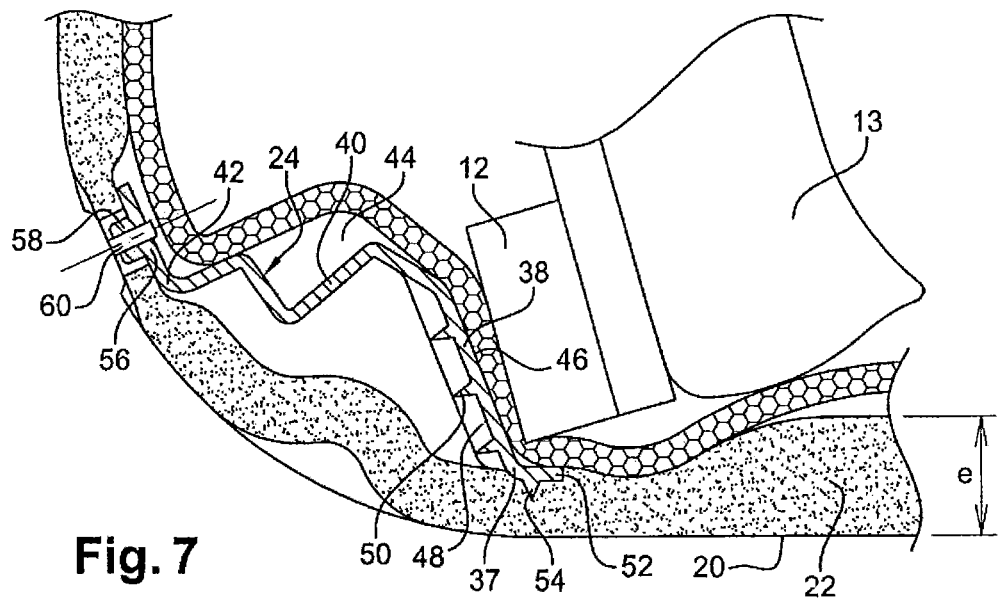
FIG. 7 is a schematic view in section of the assembly according to the invention in the loaded position in the case of an impact.

Thus, in the event of an impact, as shown in FIG. 7, the foot 13 of the user loads the element 24 via the heel 12 and the kinetic energy which is transmitted to the foot 13 is transmitted to the walls 40, 44 via the rigid rear wall 38 and then dissipated by the deformation of the walls 40, 44, which avoids the risk of injury.

Advantageously, the rigid rear transverse wall 38 comprises an outer face 46 which forms the region on which the heel 12 of the user can press and pivot and an opposite inner face 48 on the back of which there extend, transversely, a plurality of stiffening ribs 50.

In order to anchor the element 24 in the acoustic layer 22, a lower end 37 of the rigid rear transverse wall 38 comprises a lower tab 52 which comprises at least one claw 54 for gripping in the acoustic foam.

Preferably, and as shown in FIG. 6, this lower tab 52 extends substantially along the width "w" of the rear transverse wall 38 and it comprises a plurality of gripping claws 54 of substantially conical shape which are designed to penetrate into the acoustic foam 22 so as to hold the hollow casing 24.

With the rigid rear transverse wall 38 preferably extending with an inclination determined with respect to the horizontal direction of the floor 20, the lower tab 52 extends substantially horizontally parallel to the floor 20.

Moreover, in order to allow the walls 40, 44 to be crushed, it is necessary to connect the element 24 to the floor 20 of the vehicle. To that end, the front end 42 of the horizontal transverse wall 40 comprises a front tab 56 through which there passes a hole 58 which is designed to receive an element 60 for the axial immobilization of the tab 56 on the floor 20.

In this case, this immobilizing element 60 preferably comprises a stud 60 which is welded to the floor of the vehicle. The invention is not limited to this embodiment, and the floor 20 could receive a captive nut which would receive a screw passing through the hole 58 in the tab 56. The floor 20 could also receive a fir-tree stud or a clip.

It will be noted that, in this region, the floor 20 of the vehicle extends with an inclination determined close to the front end of the horizontal transverse wall 40. The front tab 56 extends substantially parallel to said inclined floor 20.

The cost of such an assembly is particularly advantageous since the casing structure of the element 24 is inexpensive and requires no particular cutting out of the acoustic foam 22. An obvious application of the invention is in entry-level vehicles, for which manufacturing costs must be extremely tightly controlled.

Moreover, the impact characteristics are more precisely controlled and the design is more flexible.

The invention claimed is:

1. An assembly for receiving a heel of a user of a motor vehicle below a pedal and/or a footrest of the passenger compartment of a motor vehicle, comprising:
   a thickness of an acoustic layer which is configured to rest on a horizontal floor, made of sheet metal, of the passenger compartment of the vehicle;
   an at least partially deformable receiving element which rests on the acoustic layer and which comprises at least one portion which projects with respect to the horizontal and which forms a region on which the heel of the user can press and pivot;
   a carpet covering the element and the acoustic layer;
   wherein the receiving element includes a hollow casing which rests on the acoustic layer and which is delimited by:
      at least one rigid rear transverse wall which projects with respect to the horizontal to form the region on which the heel of the user can press and pivot, and
      at least one horizontal transverse wall, comprising a front end which is attached to the floor of the vehicle, and which is configured to deform in event of an impact to dissipate kinetic energy of the foot of the user.

2. The assembly as claimed in claim 1, wherein the receiving element further comprises two side walls connecting the rear wall and the horizontal transverse wall, which are configured to deform in the event of an impact to help dissipate the kinetic energy of the foot of the user.

3. The assembly as claimed in claim 1, wherein the rigid rear transverse wall comprises an outer face which forms the region on which the heel of the user can press and pivot and an opposite inner face, and a plurality of stiffening ribs extends transversely across the inner face of the rigid rear transverse wall.

4. The assembly as claimed in claim 3, wherein a lower end of the rigid rear transverse wall comprises a lower tab which comprises at least one claw for gripping in its acoustic layer.

5. The assembly as claimed in claim 4, wherein the lower tab extends substantially along a width of the rear transverse wall and comprises a plurality of gripping claws of substantially conical shape which are configured to penetrate into the acoustic felt to hold the hollow casing.

6. The assembly as claimed in claim 4, wherein the rigid rear transverse wall extends with an inclination determined with respect to the horizontal orientation of the floor and the lower tab extends substantially parallel to the floor.

7. The assembly as claimed in claim 1, wherein the front end of the horizontal transverse wall comprises a front tab through which there passes a hole which is configured to receive an element for axial immobilization of the tab on the floor.

8. The assembly as claimed in claim 7, wherein the immobilizing element comprises a stud which is welded to the floor of the vehicle.

9. The assembly as claimed in claim 7, wherein the floor of the vehicle extends with an inclination determined close to the front end of the horizontal transverse wall and the front tab extends substantially parallel to the floor.

10. The assembly as claimed in claim 7, wherein the front tab is directly connected to the front end of the horizontal transverse wall.

* * * * *